United States Patent [19]

Renko

[11] 4,274,920
[45] Jun. 23, 1981

[54] WATER-COOLED NUCLEAR REACTOR WITH PASSIVE EMERGENCY SHUTDOWN AND CORE COOLING CAPABILITY AND ON-LINE REFUELING

[75] Inventor: George Renko, Jackson Heights, N.Y.

[73] Assignee: Gibbs & Hill, Inc., New York, N.Y.

[21] Appl. No.: 787,278

[22] Filed: Apr. 13, 1977

[51] Int. Cl.³ .................... G21C 3/30; G21C 19/20
[52] U.S. Cl. .................................. 176/30; 176/38; 176/77; 176/83
[58] Field of Search .................. 176/38, 87, 83, 81, 176/77, 30, 73, 74, DIG. 5

[56] References Cited

U.S. PATENT DOCUMENTS

| 2,890,158 | 6/1959 | Ohlinger | 176/81 |
|---|---|---|---|
| 2,938,791 | 5/1960 | Blainey | 176/81 |
| 2,941,933 | 6/1960 | Roake | 176/73 |
| 2,983,658 | 5/1961 | Hyman | 176/50 |
| 2,990,349 | 6/1961 | Roman | 176/45 |
| 3,228,850 | 1/1966 | Fellows | 176/58 PB |
| 3,244,597 | 4/1966 | Tower | 176/58 PB |
| 3,567,580 | 3/1971 | Nakagawa | 176/30 |
| 3,873,420 | 3/1975 | Statham | 176/83 |
| 3,928,132 | 12/1975 | Bujas | 176/83 |
| 4,028,179 | 6/1977 | Colgate | 176/38 |
| 4,045,284 | 8/1977 | Rosewell | 176/38 |

FOREIGN PATENT DOCUMENTS

| 2459339 | 1/1976 | Fed. Rep. of Germany | 176/38 |
|---|---|---|---|
| 960813 | 6/1964 | United Kingdom | 176/81 |
| 1084999 | 9/1967 | United Kingdom | 176/58 PB |
| 1420589 | 1/1976 | United Kingdom | 176/38 |

Primary Examiner—Stephen C. Bentley
Assistant Examiner—Edward F. Miles
Attorney, Agent, or Firm—Pennie & Edmonds

[57] ABSTRACT

A water-cooled nuclear reactor is provided with a passive emergency shutdown and core cooling capability by providing it with emergency fuel element dispersal means operable from internal energy contained within the reactor pressure vessel for dispersing the core fuel content into an adjacent heat sink. In a preferred embodiment, the reactor is provided with especially designed fuel elements and fuel element guides to permit passive emergency core dispersal. The reactor shutdown mechanism also facilitates reactor refueling and permits selective on-line refueling during normal reactor operation.

28 Claims, 11 Drawing Figures

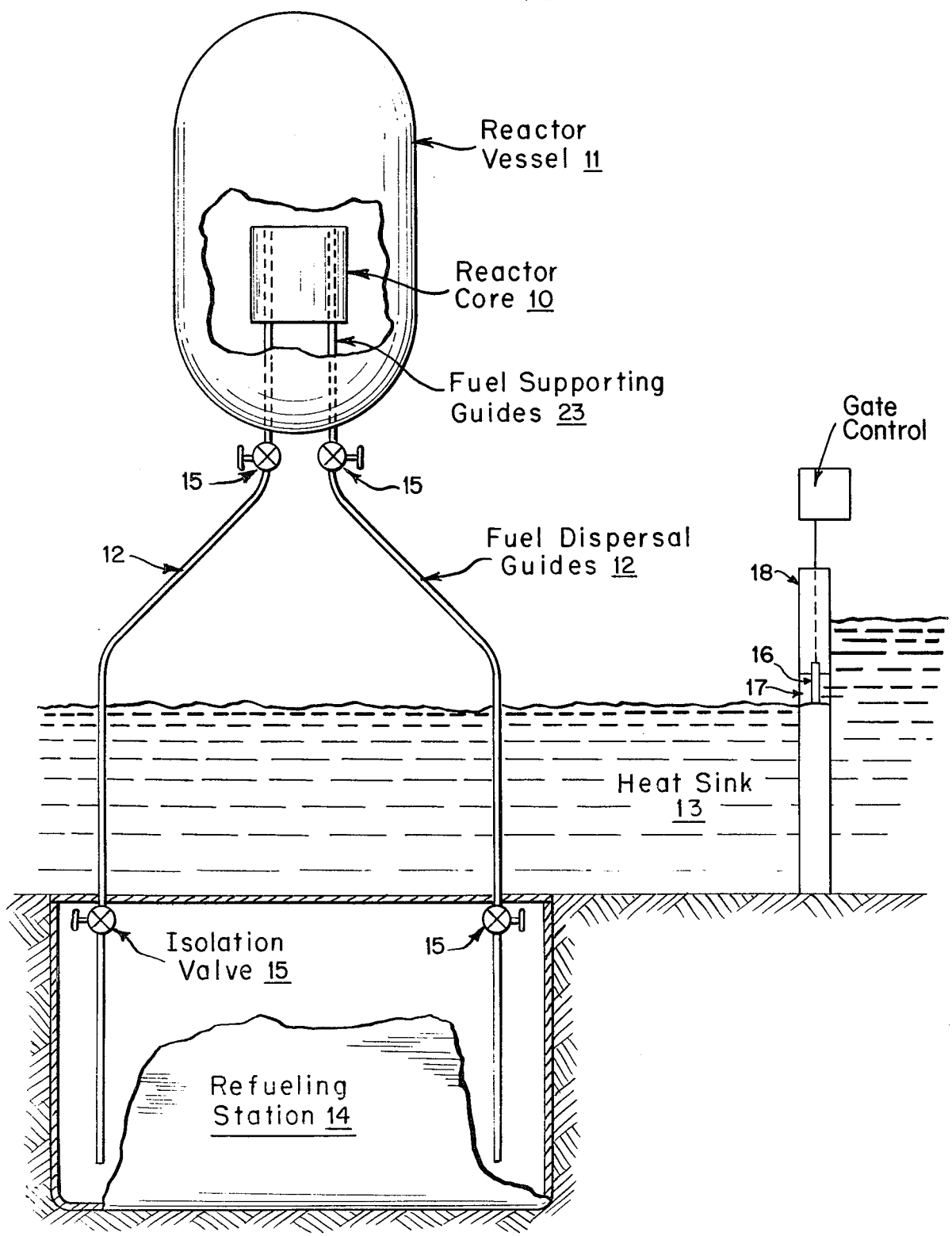

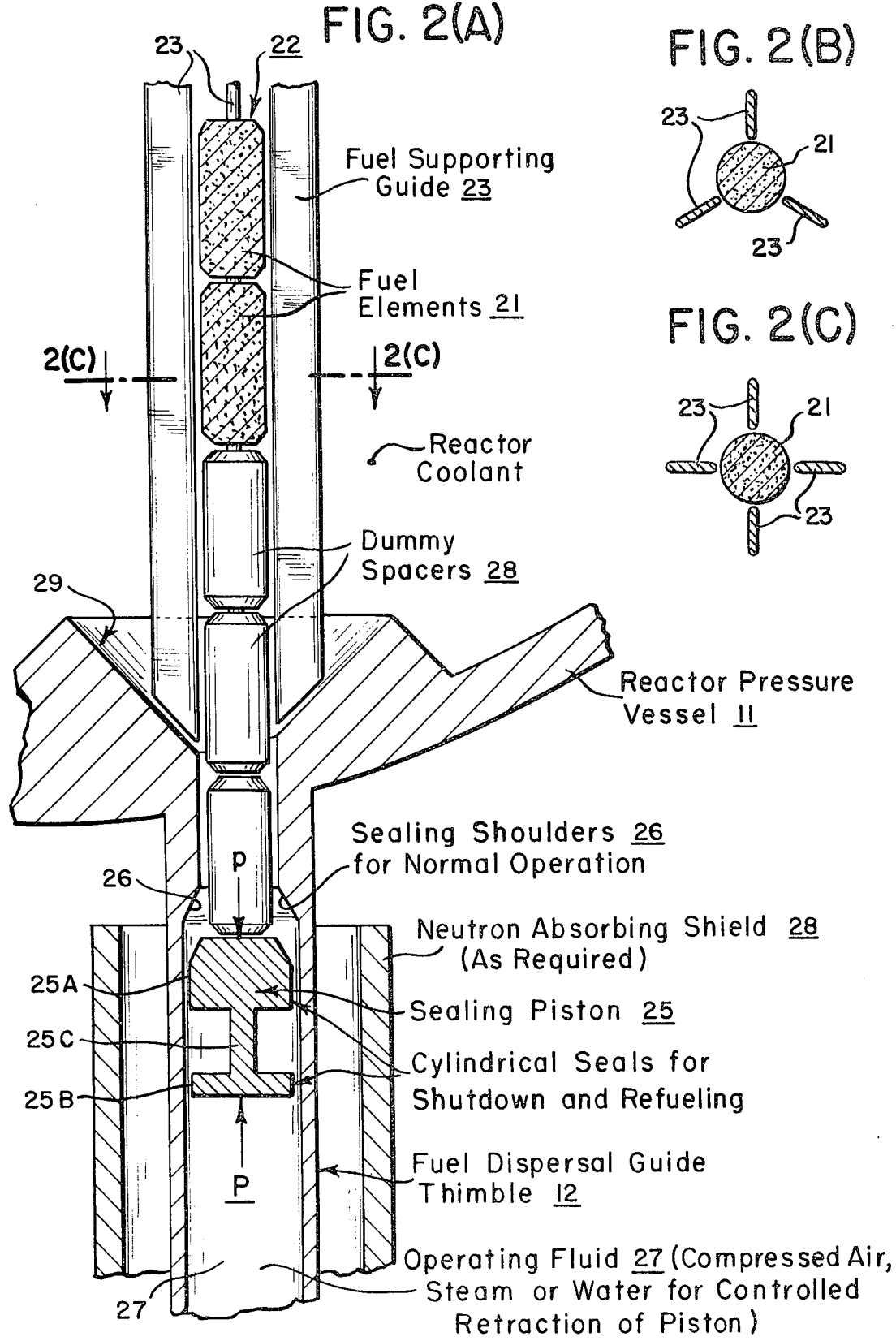
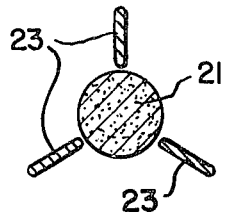
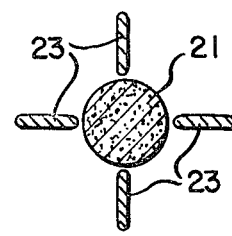

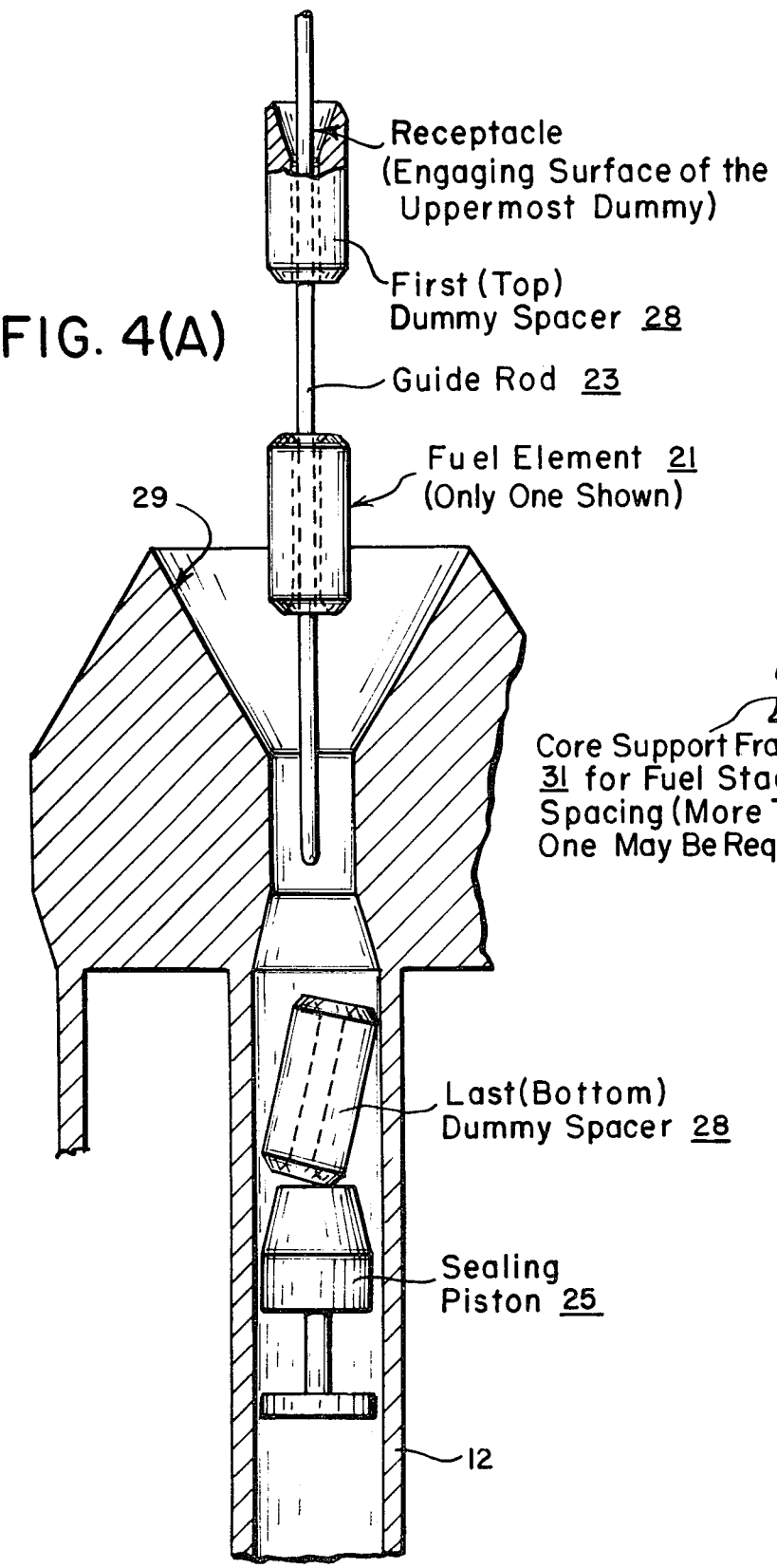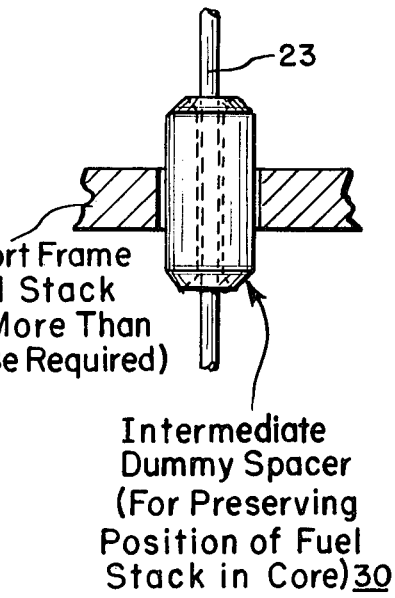

4,274,920

WATER-COOLED NUCLEAR REACTOR WITH PASSIVE EMERGENCY SHUTDOWN AND CORE COOLING CAPABILITY AND ON-LINE REFUELING

BACKGROUND OF THE INVENTION

This invention relates to water-cooled nuclear reactors; and, more specifically, to a water-cooled, water-moderated nuclear reactor having a passive emergency shutdown and core cooling capability.

Nuclear reactors are the principal means for converting the large amounts of energy released by nuclear fission into useful thermal energy. When a fissionable atom of uranium or plutonium isotope such as $U^{233}$, $U^{235}$, and $Pu^{239}$ absorbs a thermal neutron, there is a high probability that it will undergo nuclear fission, splitting into two fission products of lower atomic weight having great kinetic energy and emitting a number of neutrons. In a nuclear reactor, the kinetic energy of the fission products is dissipated as heat in the nuclear fuel elements and is removed from the reactor by a coolant in heat exchange relationship with the fuel elements. The fission neutrons are slowed down to thermal range by a moderator and, in turn, used to induce a subsequent fission in another atom in order to keep the reaction self-sustaining.

Water-cooled nuclear reactors possess a number of advantages which make them especially attractive for use in power generation. In these reactors, water performs the dual function of cooling the reactor core and moderating fission neutrons. Water-cooled reactors of many types are described in the literature of the art. (See, for example, J. K. Pickard, ed., *Nuclear Power Reactors*, Van Nostrand, 1957.) A typical heterogeneous water-cooled nuclear reactor comprises, in essence, a reactor pressure vessel and a nuclear chain reacting core made up of a plurality of nuclear fuel element assemblies. Each fuel assembly comprises an open-ended tubular flow channel surrounding a bundle of rod-type nuclear fuel elements—each of which is typically zirconium-clad enriched uranium oxide. Water is circulated through the channels and around the fuel rods both to remove heat and to act as a moderator.

One of the problems facing the designers of water-cooled reactors is that of providing adequate emergency shutdown and core cooling capability. Because nuclear reactor cores are capable of spontaneous energy generation, and because of the critical necessity for containing within appropriate shielding nuclear fuels and the reaction products thereof, emergency shutdown and core-cooling systems are essential. Systems must be provided which can, in the event of an emergency such as a failure of the coolant pumping system: (1) stop the self-sustaining chain reaction; and (2) dissipate the residual heat (a) stored in the reactor core, and (b) generated by spontaneous decay after shutdown. Such systems are required in order to ensure that, in the event of such an emergency, the reactor core cannot accumulate sufficient heat to penetrate or destroy its shielding.

A major shortcoming of conventional reactor designs is that they typically rely upon active hardware to perform emergency shutdown or emergency cooling. For example, reactor cores are typically located some distance from any heat sink having a capacity adequate for emergency core cooling. As a consequence, they require prolonged and sustained operation of active hardware, such as water pumps, to effect the necessary transfer of residual core heat. Such systems are potentially vulnerable to conceivable accidents and failures because they are critically dependent upon sources of energy external of the core and upon means for delivering that energy.

BRIEF SUMMARY OF THE INVENTION

In accordance with the present invention, a water-cooled nuclear reactor is provided with a passive emergency shutdown and core cooling capability by providing it with emergency fuel element dispersal means operable from internal energy contained within the reactor pressure vessel for dispersing the core fuel content into an adjacent heat sink. In a preferred embodiment, the reactor is provided with especially designed fuel elements and fuel element guides to permit passive emergency core dispersal. The reactor shutdown mechanism also facilitates reactor refueling and permits selective on-line refueling during normal reactor operation.

BRIEF DESCRIPTION OF THE DRAWINGS

The advantages, nature, and various additional features of the present invention will appear more fully upon consideration of the illustrative embodiments now to be described in detail in connection with the accompanying drawings in which:

FIG. 1 is a schematic illustration of a nuclear reactor in accordance with the invention.

FIGS. 2(A)–2(C) pertain to a first example of a passive fuel element dispersal arrangement useful in the reactor of FIG. 1.

FIGS. 4(A) and 4(B) pertain to a second example of a passive fuel element dispersal arrangement useful in the reactor of FIG. 1.

For convenience of reference, similar structural elements are designated by the same reference numerals throughout the drawings.

DETAILED DESCRIPTION

Figure 3A:
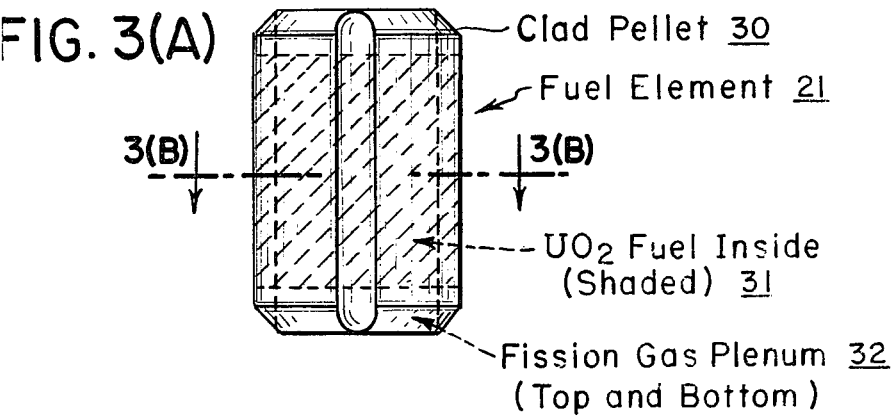
FIGS. 3(A) and 3(B) are transverse cross sections of a fuel element useful in conjunction with the dispersal arrangement of FIG. 2.

Referring to the drawings, FIG. 1 is a schematic illustration of a nuclear reactor in accordance with the general concept of the invention comprising a reactor core 10 including a plurality of nuclear fuel elements (not shown in FIG. 1), a surrounding reactor vessel 11, including appropriate radiation, thermal and environmental shielding, fuel dispersal guide conduits (or thimbles) 12, a heat sink 13 of heat capacity adequate to absorb the residual heat contained in the reactor core at the time of dispersal and spontaneously generated thereafter, and an optional refueling station 14 to perform on-line refueling. Control rods (not shown) are conventionally provided for reactor power control and non-emergency shutdown.

The fuel dispersal guides 12, only two of which are shown, provide guide paths for fuel elements from the reactor vessel 11 to heat sink 13. The guides generally diverge along these paths from a critical configuration within the reactor core to a non-critical dispersal configuration within the heat sink. Conveniently, the guides comprise hollow tubular members, in the form of pipes or thimbles, which fan out from the reactor pressure vessel into the heat sink. These members are closed with respect to the heat sink in order to maintain a pressure barrier between the reactor core and the heat sink. The portions of guides 12 immersed in water of the heat sink are preferably of sufficient length to accommodate the entire lengths of fuel stacks in their non-critical configuration. Advantageously, the guides 12 comprise vertical portions immersed in water which can accommodate the entire fuel content of respective fuel stacks.

Inside the reactor vessel the fuel elements are conveniently supported and guided by fuel supporting guides 23.

Heat sink 13 is conveniently a body of water such as a short, wide tunnel open to a large body of water such as a river, lake, or ocean. Advantageously, the water level in the tunnel is gravitationally maintained by the natural water level of the outside body of water. Preferably, the heat sink is accommodated within the seismic support region for the reactor.

The reactor core 10 is disposed sufficiently adjacent to and preferably above the heat sink 13 so that the utilizable energy content of the pressure vessel and the core, e.g., the potential energy due to gravitational forces and the potential energy due to pressurized contents of the pressure vessel and its associated accumulator tanks, is adequate to drive the bulk of the core fuel content from the reactor vessel, along the dispersal guides 12 and into the heat sink in a non-critical dispersal configuration wherein the chain-reacting relationship is terminated and the dispersed fuel is gradually cooled down by conduction through the guide tube walls into the heat sink.

As a safety feature in case of damage to the fuel dispersal guides, isolation means can be provided for isolating heat sink 13 from the general environment. Such isolation can take the form of an arrangement for permitting the flow of water into the tunnel but preventing it from leaving, such as a fast dropping gate in a throat connecting to the outside water. Fast dropping gate 16—which may be connected to a gate control—is provided for throat 17 in wall 18. The water level outside wall 18 is higher than the water level in the tunnel for replenishing water in the heat sink. Such isolation means would prevent widespread contamination of the outside body of water. Replenishing means is thus provided for replenishing the water in the tunnel which is evaporated by residual heat of the dispersed core in the thimbles by allowing for overflow feeding from the higher water level in the outside lake or river. Operation of the isolation and replenishing means should follow any detection of radioactivity in the water of heat sink 13, and decontamination of the isolated portion of the heat sink should follow.

A refueling station 14 is conveniently coupled to a continuation of fuel dispersal guides 12 to permit on-line refueling after fuel elements are retrieved beyond the cooling zone of the heat sink.

Isolation valves 15 are advantageously provided to control access between the reactor vessel and the dispersal guides and between the dispersal guides and the refueling station.

FIG. 2(A) is a transverse cross section of a portion of a nuclear reactor having a passive fuel element dispersal arrangement in accordance with a preferred embodiment of the invention. In substance, nuclear fuel elements 21 are disposed inside a reactor pressure vessel 11 in a plurality of stacks or columnar arrangements 22 (only one of which is shown). Respective dispersal guide thimbles 12 penetrating the pressure vessel, but sealed with respect to the reactor vessel exterior, are provided for receiving fuel elements from one or more of the columnar arrangements while maintaining the pressure barrier. The fuel dispersal guide tubes can conveniently be made of stainless steel, such as type 304ss or Inconel (ASME-SB-163).

Preferably, guide means are provided within the pressure vessel for constraining each column of fuel elements in alignment with the respective dispersal guide thimbles and for supporting the fuel elements inside the core. Such guide means can conveniently comprise a plurality of longitudinally straight-edged stainless steel members 23 radially positioned around each fuel column. In a preferred arrangement shown in FIG. 2(B), at least three such elements are spaced around each column approximately 120° apart. In an alternative arrangement shown in FIG. 2(C), four elements are used and spaced approximately 90° apart. These guides facilitate the up-and-down sliding of fuel elements essential for emergency shutdown and refueling operations.

In addition, removable support means are provided for constraining the nuclear fuel elements within the operative region of the reactor core during the operating cycle and, advantageously, removable sealing means are provided for sealing the dispersal guide thimbles from the reactor core during normal core operation. In the embodiment of FIG. 2, both the support and sealing functions are performed by a sealing piston 25 which is held in position in guide thimble 12 against conical sealing shoulders 26 by hydraulic means, such as a source (not shown) of pressurized fluid 27 coupled to thimble 12. Condensate or demineralized water of reactor coolant quality may conveniently serve as pressurized fluid, since any leaks of such water past the piston (particularly during refueling) will not contaminate, or in any way degrade, the reactor coolant. Preferably, sealing piston 25 comprises two or more cylindrical surfaces 25A and 25B, equipped with sealing rings, and arranged in tandem by a relatively flexible link 25C in order that the piston can easily follow bends in thimble 12. The upper part of the piston has a matching conical surface to the sealing shoulders 26 to effectuate a tight seal. As long as fluid pressure P remains greater than counteracting pressure p, which is a sum of pressure of the reactor coolant and weight of the fuel column, the reactor remains sealed, and the fuel is positioned in the core.

One or more dummy spacer elements 28 can be conveniently provided between the piston and the fuel elements in order to space the fuel elements away from the sealing area into the operative region of the reactor core.

In the event of conditions requiring emergency shutdown, support for columnar arrangement 22 is removed as by a controlled decrease in the pressure P of pressurized fluid 27 supporting piston 25, and the fuel elements drop from the reactor core through dispersal thimble 12 into a non-critical dispersal configuration within a heat sink (not shown) in the manner described in connection with FIG. 1. This emergency dispersal is substantially completely passive in that the energy required for dispersal is provided by the potential energy due to gravitational pull on the fuel elements and the potential energy due to the pressurized reactor coolant in the pressure vessel.

In case of a loss of coolant accident (LOCA), the surge drums or the accumulator and volume control tanks (not shown but typical features in present day reactor designs) provide sufficient pressure for a sufficient duration to effectuate a complete fuel dispersal into the thimbles. At the completion of dispersal, valves 15 of FIG. 1 near the reactor vessel can be closed; and the pressure in the thimbles can be passively maintained by an additional small tank (not shown) connected to the thimbles.

The speed of movement of the sealing piston and the fuel elements can be easily controlled by controlling the pressure of the pressurized fluid P. Such control can be exercised simultaneously for all of the thimbles, as in emergency shutdown, or selectively with only one or a few thimbles, as in refueling or retrieving and replacing damaged fuel elements.

In case refueling is desired, the stacks containing the elements to be replaced are selectively withdrawn from the core through the respective appropriate thimbles to refueling station 14. New fuel elements are substituted for the fuel elements to be replaced, and the process is reversed. Thus, the refueled stack is driven up through the fuel dispersal guides into the reactor vessel by operating fluid of a pressure P, greater than the counteracting pressure p until the sealing piston seals the reactor again at the conical piston-to-shoulder contact just below the reactor vessel. The pressure relationship $P > p$ is maintained throughout the operation of the reactor and remains a relatively static feature. This capability for selective withdrawal has the important advantage of permitting on-line refueling or replacement of selected stacks without reactor shutdown and costly disassembly.

Depending upon the proximity of the fuel dispersal guides to each other, in some areas, such as near the reactor vessel, it can be advantageous to supply a neutron-absorbing shield 28 around the thimbles in order to prevent criticality. Such a shield can be comprised of typical control rod materials of high neutron absorption cross section such as boron, cadmium, hafnium, or alloys thereof. Preferred shields comprise boron carbide or boron clad in or alloyed with stainless steel.

As an additional safety feature, intended for an unlikely event of non-effective core evacuation combined with a concurrent failure of coolant circulation that may result in a core melt-down, the inside reactor bottom surface can be provided with a refractory bottom 29 shaped to funnel any molten material from fuel elements 21 into cooling thimbles 12 where it will cool and solidify. In the unlikely event of core melting, this feature would provide non-critical emergency dispersal of the molten core material.

Figure 6:
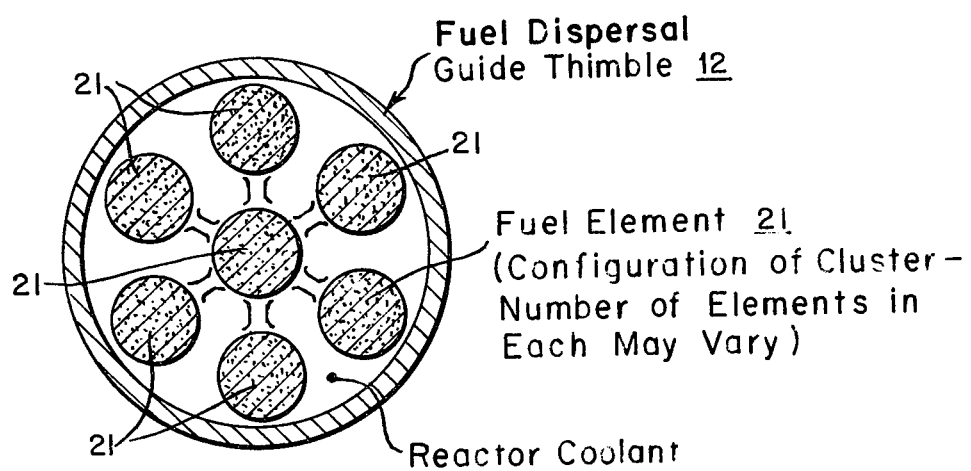
FIG. 6 is a transverse cross section of an alternative fuel element cluster useful in conjunction with the dispersal arrangement of FIG. 2.

While the columnar arrangement 22 of FIG. 2 is an arrangement of individual fuel elements 21, it is clear that one could substitute for each individual fuel element a cluster of fuel elements, and the emergency dispersal system would operate in substantially the same manner on a correspondingly enlarged scale employing simultaneous dispersal of multiple fuel elements into fewer but larger cooling thimbles. A preferred embodiment of a hexagonal arrangement of fuel elements in cluster, as exemplified in FIG. 6, has geometrical advantages in that it can be easily patterned into core cross section and can be easily accommodated in tubular cooling thimbles after shutdown or during refueling.

Figure 3B:
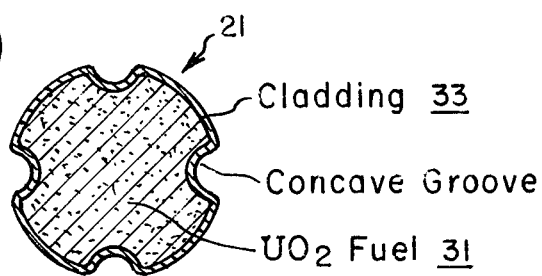

FIGS. 3(A) and 3(B) illustrate a preferred form of a nuclear fuel element 21 for use in the embodiment of FIG. 2, comprising a clad pellet 30 of nuclear fuel 31, such as enriched uranium dioxide, having a longitudinal dimension preferably not exceeding about three times its maximum axial direction. This compact geometry is desirable in order to permit the fuel element to readily pass through embodiments of the invention using curved dispersal thimbles. Each individual fuel element is provided with a fission gas plenum 32 at each end.

The cladding 33 is preferably of Zircaloy and advantageously defines a plurality of longitudinally extending concave grooves, the spring action of which permits cladding expansion without reduction of cladding wall thickness upon swelling. This feature allows fuel elements to be fabricated with the cladding tightly compressed onto the nuclear fuel for a better heat transfer from fuel to cladding to coolant. Spring action of the grooves will maintain tight fuel-to-cladding contact throughout the life of the fuel element.

Gained heat conductivity through tight fuel-to-cladding contact may be employed to strengthen the cladding walls for better isolation of radioactive decay components in the fuel from the coolant, thus lessening the likelihood of coolant contamination. Specifically, the fuel elements can be provided with cladding which is of reinforced (greater) thickness than that required to obtain comparable heat transfer in a non-compressed structure.

FIG. 4(A) is a transverse cross section of a portion of a nuclear reactor having a passive fuel element dispersal system in accordance with a second embodiment of the invention. In substance, the arrangement of FIG. 4(A) is substantially the same as that of FIG. 2, except that the fuel elements 21 are provided with longitudinally extending hollow centers, and guide 23 is a guide rod member, such as a stainless steel rod or tube, inserted through the hollow centers of the respective fuel elements. In addition, the first (uppermost) dummy spacer 28 can conveniently be provided with an enlarged funnel-shaped receptacle to engage the guide rod 23 during the fuel loading operation. In a preferred arrangement, one or more intermediate dummy spacers 30 may be provided to be positioned at each level of one or more core support frames 31, as illustrated in a detail of FIG. 4(B). Such an arrangement limits horizontal movement and vibration of the fuel elements.

In the event of emergency shutdown, fuel element support is removed and the fuel elements drop off guide rod 23 into the dispersal thimble 12. In all other respects, the operation of this embodiment is substantially the same as that described in connection with FIGS. 1 and 2.

Figure 5A:
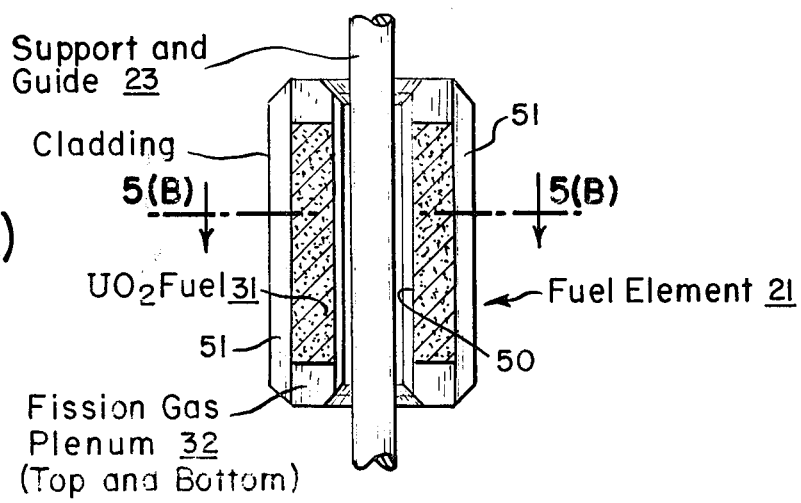
FIGS. 5(A) and 5(B) are cross sections of a fuel element useful in conjunction with the dispersal arrangement of FIG. 4.
Figure 5B:
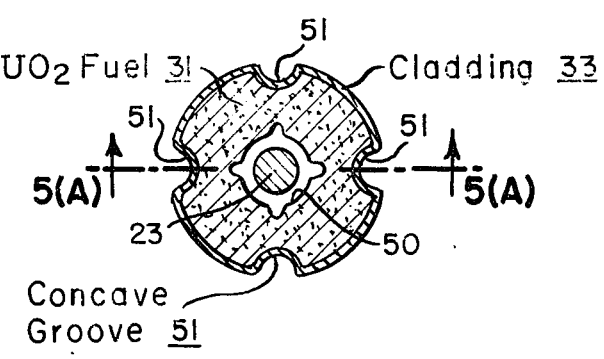

FIGS. 5(A) and 5(B) illustrate a preferred fuel element 21 for use in the arrangement of FIG. 4. In substance, this fuel element is the same as that described in connection with FIG. 3 except that it includes a longitudinally extending hollow center 50 for receiving guide rod 23. Advantageously the cladding in the hollow center region is provided with longitudinally extending concave grooves 51 for accommodating fuel swelling.

Like the fuel element of FIG. 3, the longitudinal dimension of this fuel element preferably should not exceed about three times the maximum axial dimension so that the fuel element can be utilized in embodiments using a curved dispersal thimble.

This arrangement offers an advantage over the design in FIG. 3 in that the hollow center eliminates the inherent problem of fuel melting in the center of a solid pellet.

Enriched uranium dioxide has been cited in connection with FIGS. 3A, 3B, 5A, and 5B, however essentially the same specific embodiments can be employed for plutonium dixoide, $PuO_2$, containing $Pu^{239}$ as a fuel or as a mixture of $PuO_2$ and $UO_2$, containing $Pu^{239}$ and $U^{235}$. In such embodiment 316 stainless steel can be used as an alternate material for fuel element cladding.

While the invention has been described in connection with only a small number of specific embodiments, it is clear that numerous and varied additional arrangements can be devised by those skilled in the art without departing from the spirit and scope of the invention.

I claim:

1. A water-cooled nuclear reactor which operates at an elevated temperature and pressure during normal operation having passive emergency shutdown and core cooling capability, comprising:
   a reactor core comprising a plurality of columnar arrangements of nuclear fuel elements disposed during normal operation within a pressure vessel in a chain reacting relationship, said pressure vessel containing at least sufficient energy to disperse the bulk of the core fuel content by driving it from the core;
   a plurality of hollow fuel dispersal guide conduits penetrating said pressure vessel at locations beneath said columnar arrangements and generally aligned therewith, said dispersal guide conduits being generally divergent at least along portions of their length substantially immediately beneath said pressure vessel for receiving nuclear fuel elements therefrom in the event of emergency shutdown and for guiding and dispersing said fuel elements whereby said fuel elements become spaced sufficiently to assume a non-critical dispersed configuration;
   an external heat sink of capacity adequate to absorb the residual heat contained in the reactor core and spontaneously generated by said nuclear fuel elements after shutdown, said heat sink being disposed beneath said reactor core so that gravitational attraction aids in driving said nuclear fuel elements along said dispersal guide conduits into said dispersed configuration for cooling said nuclear fuel elements in the event of emergency shutdown;
   means positioned in series with each guide conduit for communicating said conduit with said pressure vessel for initiating transfer of fuel elements from said pressure vessel into said associated dispersal guide conduit in the event of emergency shutdown; and
   means positioned in series with each guide conduit and adjacent said heat sink for permitting selective withdrawal of fuel elements from, and/or loading fuel elements into, said associated conduit.

2. A reactor according to claim 1 wherein said heat sink comprises a body of water accommodated within the seismic support region of the reactor, and emergency gating means are provided for permitting gravitational replenishment of evaporated water while preventing the flow of said water out of the heat sink in the event of fuel dispersal guide rupture.

3. A nuclear reactor according to claim 1 including guide means within said pressure vessel for constraining the fuel elements comprising said columnar arrangements in alignment with said fuel dispersal guide conduits while permitting upward and downward slidable movement thereof along said guide means and into or out of said dispersal conduits.

4. A nuclear reactor according to claim 1 further comprising longitudinally straight-edged guide means radially positioned around each of said columnar arrangements for constraining the fuel elements of said arrangements in alignment with said fuel dispersal guide conduits while permitting upward and downward slidable movement along said straight edged guide means and into or out of said dispersal guide conduits.

5. A nuclear reactor according to claim 1 wherein a plurality of fuel elements comprising a plurality of columnar arrangements, each has a generally longitudinally extending hollow interior portion and is disposed in said reactor core on a guide member inserted into said hollow interior portion for constraining said fuel elements in alignment with said fuel dispersal guide conduits while allowing upward and downward slidable movement thereof along said guide member and into or out of said dispersal guide conduits.

6. A nuclear reactor according to claim 5 wherein a pluraltiy of said columnar arrangements comprises one or more hollow dummy elements positioned at the levels of one or more respective core support frames for limiting horizontal movement and vibration of said columnar arrangement.

7. A nuclear reactor according to claim 5 wherein the uppermost element of said columnar arrangement comprises a hollow dummy spacer with an enlarged funnel-shaped receptacle for facilitating engagement with said guide member during fuel loading.

8. A nuclear reactor according to claim 1 wherein the portion of the reactor beneath said columnar arrangement is provided with a surface shaped to funnel molten material from said columnar arrangement into said dispersal guide conduits.

9. A nuclear reactor according to claim 1 wherein said means for initiating transfer of said fuel elements from said core into each dispersal guide conduit comprise a piston member positioned within, and slidable along, the hollow interior of said conduit and held in position at the pressure vessel by pressurized fluid for supporting said fuel elements during normal operation of the reactor.

10. A nuclear reactor according to claim 9 wherein said pressurized fluid used to hold said piston in position is comprised of reactor coolant quality water.

11. A nuclear reactor according to claim 9 wherein said piston member comprises sealing means for sealing said fuel dispersal guide conduit from said reactor pressure vessel during normal core operation.

12. A nuclear reactor according to claim 9 wherein said guide conduits comprise sealing shoulders for receiving said piston in sealing engagement while said piston member is held in position for supporting said fuel elements during normal core operation.

13. A nuclear reactor according to claim 1 wherein a plurality of said fuel elements comprise clad fuel elements of nuclear fuel having a maximum longitudinal dimension not exceeding about three times the maximum transverse dimension in order to facilitate entry into said fuel dispersal guide conduits.

14. A nuclear reactor according to claim 1 wherein a hollow tubular member of neutron absorbing material is disposed around at least a portion of the emergency dispersal path of said fuel elements.

15. A nuclear reactor according to claim 1 wherein a plurality of said fuel elements having hollow interiors are provided with a plurality of longitudinally extending concave grooves for permitting cladding expansion with minimal reduction of cladding wall thickness upon fuel swelling.

16. A nuclear reactor according to claim 15 wherein a plurality of said fuel elements having hollow interiors are provided with a cladding tightly compressed onto a fuel pellet for facilitating heat transfer from fuel to coolant.

17. A nuclear reactor according to claim 16 wherein a plurality of said fuel elements with compressed cladding are provided with cladding which is of reinforced thickness as compared to the thickness of cladding required to obtain comparable heat transfer in a corresponding, non-compressed structure.

18. A nuclear reactor according to claim 1 wherein a plurality of said fuel elements are provided with a plurality of longitudinally extending concave grooves for permitting cladding expansion with minimal reduction of cladding wall thickness upon fuel swelling.

19. A nuclear reactor according to claim 18 wherein a plurality of said fuel elements are provided with a cladding tightly compressed onto a fuel pellet for facilitating heat transfer from fuel to coolant.

20. A nuclear reactor according to claim 19 wherein a plurality of said fuel elements with compressed cladding are provided with cladding which is of reinforced thickness as compared to the tickness of cladding required to obtain comparable heat transfer in a corresponding, non-compressed structure.

21. A nuclear reactor according to claim 1 wherein a plurality of said fuel elements are assembled into a multi-element cluster.

22. A nuclear reactor according to claim 1 comprising a plurality of normally open isolation valves for permitting fuel discharge into said fuel dispersal guide conduits.

23. A reactor according to claim 1 including a reactor refueling station coupled to said fuel dispersal guide conduits for on-line refueling.

24. A reactor according to claim 1 wherein said means associated with each conduit for communicating said conduit with said pressure vessel for initiating transfer of fuel elements comprises a pressure barrier to provide sealing engagement between said reactor pressure vessel and said dispersal guide conduits during normal reactor operation.

25. A nuclear reactor according to claim 1 wherein a plurality of said columnar arrangements of nuclear fuel elements comprise one or more dummy spaces for supporting said nuclear fuel elements in the operative region of the reactor core.

26. A water-cooled nuclear reactor which operates at an elevated temperature and pressure during normal operation having passive emergency shutdown and core cooling capability, comprising.
   a reactor core comprising a plurality of columnar arrangements of nuclear fuel elements disposed during normal operation within a pressure vessel in a chain reacting relationship, said pressure vessel containing at least sufficient energy to disperse the bulk of the core fuel content by driving it from the core;
   a plurality of hollow fuel dispersal guide conduits configured to diverge to a non-critical dispersed configuration penentrating said pressure vessel at locations beneath said columnar arrangements and generally aligned with said arrangements for receiving nuclear fuel elements therefrom in the event of emergency shutdown and for guiding and dispersing said fuel elements whereby said fuel elements become spaced sufficiently to assume a non-critical configuration.
   an external heat sink in the form of a body of water of capacity adequate to absorb the residual heat contained in the reactor core and spontaneously generated by said nuclear fuel elements after shutdown, said heat sink being disposed beneath said reactor core so that gravitational attraction aids in driving said nuclear fuel elements along said dispersal guide conduits into said dispersed configuration, and for cooling said nuclear fuel elements by conduction and convection in the event of emergency shutdown;
   means positioned in series with each guide conduit between said pressure vessel and said heat sink communicating the conduit with said pressure vessel for initiating transfer of fuel elements from said reactor vessel into said associated dispersal guide conduit in the event of emergency shutdown; and
   means positioned in series with each guide conduit and positioned beneath said heat sink in a reactor refueling station for permitting selective withdrawal of fuel elements from, and/or loading fuel elements into, said associated conduits.

27. A nuclear reactor according to claim 26 further comprising a refueling station positioned beneath said heat sink for withdrawal of fuel elements from, and/or loading fuel elements into, said associated conduits.

28. A water-cooled nuclear reactor which operates at an elevated temperature and pressure during normal operation having passive emergency shutdown and core cooling capability, comprising:
   a reactor core comprising a plurality of columnar arrangements of nuclear fuel elements disposed during normal operation within a pressure vessel in a chain reacting relationship, said pressure vessel containing at least sufficient energy to disperse the bulk of the core fuel content by driving it from the core;
   a plurality of generally divergent hollow fuel dispersal guide thimbles in the form of hollow tubular members penetrating said pressure vessel at locations beneath said columnar arrangements and generally aligned with said arrangements for receiving nuclear fuel elements therefrom in the event of emergency shutdown and for guiding and dispersing said fuel elements whereby said fuel elements become spaced sufficiently to assume a non-critical configuration;
   an external heat sink of capacity adequate to absorb the residual heat contained in the reactor core and spontaneously generated by said nuclear fuel elements after shutdown, said heat sink being disposed sufficiently adjacent said reactor core to permit the energy contained in said vessel to drive said fuel elements along said dispersal guide thimbles into a non-critical dispersed configuration and to cool said fuel elements by conduction and convection by said heat sink;

means positioned in series with each guide thimble on a first side of said heat sink between said pressure vessel and said heat sink for communicating the thimble said pressure vessel for initiating transfer of fuel elements from said pressure vessel into said associated dispersal guide thimbles in the event of emergency shutdown; and means positioned in series with each guide thimble on a second side of said heat sink distant from said pressure vessel for selectively withdrawing fuel elements from and/or loading fuel elements into said associated thimble.

* * * * *

UNITED STATES PATENT AND TRADEMARK OFFICE
CERTIFICATE OF CORRECTION

PATENT NO. : 4,274,920
DATED : June 23, 1981
INVENTOR(S) : George Renko

It is certified that error appears in the above-identified patent and that said Letters Patent are hereby corrected as shown below:

Column 7, line 52, the line beginning with "means" should begin at the margin defining the subparagraphs;

Column 9, line 34, "tickness" should read --thickness--;

Column 9, line 63, "comprising." should read --comprising:--;

Column 10, line 12, "configuration." should read --configuration;--; and

Column 11, line 6, "thimble said" should read --thimble with said--.

Signed and Sealed this

Tenth Day of November 1981

[SEAL]

Attest:

GERALD J. MOSSINGHOFF

Attesting Officer    Commissioner of Patents and Trademarks